(12) United States Patent
Krause

(10) Patent No.: US 8,162,134 B2
(45) Date of Patent: Apr. 24, 2012

(54) CONVEYOR BELT

(75) Inventor: Hans-Joachim Krause, Westerholz (DE)

(73) Assignee: Krones AG, Neutraubling (DE)

( * ) Notice: Subject to any disclaimer, the term of this patent is extended or adjusted under 35 U.S.C. 154(b) by 0 days.

(21) Appl. No.: 12/876,360

(22) Filed: Sep. 7, 2010

(65) Prior Publication Data

US 2011/0056810 A1   Mar. 10, 2011

(30) Foreign Application Priority Data

Sep. 9, 2009 (DE) .................... 10 2009 040 773

(51) Int. Cl.
*B65G 17/24* (2006.01)
(52) U.S. Cl. ....................... 198/779; 198/850
(58) Field of Classification Search ............ 198/779, 198/850, 853; 193/35 MD
See application file for complete search history.

(56) References Cited

U.S. PATENT DOCUMENTS

| | | | |
|---|---|---|---|
| 3,082,861 A * | 3/1963 | Kornylak | 198/850 |
| 3,123,202 A | 3/1964 | Stevens | |
| 3,550,756 A * | 12/1970 | Kornylak | 198/779 |
| 3,674,130 A | 7/1972 | Carmichael | |
| 7,971,708 B2 * | 7/2011 | Menke et al. | 198/779 |

FOREIGN PATENT DOCUMENTS

| | | |
|---|---|---|
| DE | 2045028 A1 | 3/1971 |
| DE | 2100932 A1 | 8/1972 |
| DE | 10033499 A1 | 1/2002 |
| DE | 102004021262 A1 | 11/2005 |
| EP | 0756145 A2 | 1/1997 |
| WO | WO-2005108248 A1 | 11/2005 |
| WO | WO-2007114694 A1 | 10/2007 |

OTHER PUBLICATIONS

German Search Report for DE 102009010773.1 dated Apr. 20, 2010.

* cited by examiner

*Primary Examiner* — James R Bidwell
(74) *Attorney, Agent, or Firm* — Marshall, Gerstein & Borun LLP

(57) ABSTRACT

A conveyor belt, in particular for a pasteurizer, with a conveyor surface and with support rollers, which are arranged beneath the conveyor surface and support it on a carrier. In order to improve the protection of the conveyor belt against glass breakage without having to significantly increase the drive power, that the conveyor surface is formed from metal.

8 Claims, 4 Drawing Sheets

CONVEYOR BELT

CROSS-REFERENCE TO RELATED APPLICATION

The present application claims the benefit of priority of German Application No. 102009040773.1, filed Sep. 9, 2009. The entire text of the priority application is incorporated herein by reference in its entirety.

FIELD OF THE DISCLOSURE

The disclosure relates to a conveyor belt, in particular for a pasteurizer of the type.

BACKGROUND

A conveyor belt of this nature is known from DE 10 2004 021 262 A1. The known conveyor belt is formed for endless circulation around two spaced rollers and is used to transport containers filled with product, for example bottles or jars, through a pasteurizer, where pasteurizing of the contents of the container occurs through thermal exposure over a certain time. The known conveyor belt is constructed of single segments, whereby each segment has one or several carrying straps which are joined together to form a carrying grid. Through the straps bars protrude which extend over the complete width transverse to the conveying direction of the conveyor belt and join together the segments of a transverse row running transverse to the conveying direction as well as hinges for a relative movement of the adjacent segments in a row running longitudinally to the conveying direction. These bars are also used as support for supporting rollers, which are arranged under selected segments and support them and thereby also the complete conveyor belt on a beam. On the upper side of the straps a plastic upper part is mounted, which forms the conveyor surface. The conveyor surface is formed by plastic ridges located adjacent to one another with a close spacing and arranged edgeways with the narrow sides forming the conveyor surface. Thus it is ensured that the containers rest on the conveyor surface safe from tilting and the spaces between the plastic ridges are relatively narrow. If a jar now fractures within the pasteurizer, the glass fragments can make the conveyor surface pitted or can even become jammed between the plastic ridges so that the conveyor belt is damaged.

SUMMARY OF THE DISCLOSURE

One aspect of the disclosure is to provide a conveyor belt which is less susceptible to damage.

It has been surprisingly found that the support rollers used with the known conveyor belt can without further ado also bear the heavier weight of a metal conveyor surface without an excessively increased drive energy having to be applied. The combination of the support rollers with a conveyor surface in metal thus leads to a conveyor belt which can withstand glass breakage very well without the previous disadvantages of steel and metal conveyor belts arising, i.e. a high demand on drive energy due to the substantially increased weight.

The use of horizontally arranged metal sheet forms a very smooth surface, on which the containers can be easily pushed, also automatically. The use of perforated sheet for the conveyor surface creates sufficient drainage through which the overflowing or leaking liquid can be drawn off.

The support rollers need not necessarily be provided under each segment, whereby preferably the segments located at the outside in the transverse direction are supported by the rollers.

The conveyor surfaces of adjacent segments in the transverse direction should essentially lie next to one another without a gap. This can be preferably achieved by a transverse joining device between adjacent segments transverse to the conveying direction. Alternatively or additionally, clamping devices can be provided on the ends of articulated shafts, which connect adjacent segments in the transverse row together.

Preferably the support roller is also seated on the articulated shafts.

Support and guide straps provided at the side, which are arranged on adjacently situated articulated shafts in the conveying direction, ensure a smooth and straight run for the conveyor belt according to the disclosure.

BRIEF DESCRIPTION OF THE DRAWINGS

An embodiment of the disclosure is explained in more detail in the following based on the drawings. The following are shown.

DETAILED DESCRIPTION OF THE PREFERRED EMBODIMENT

Figure 1:
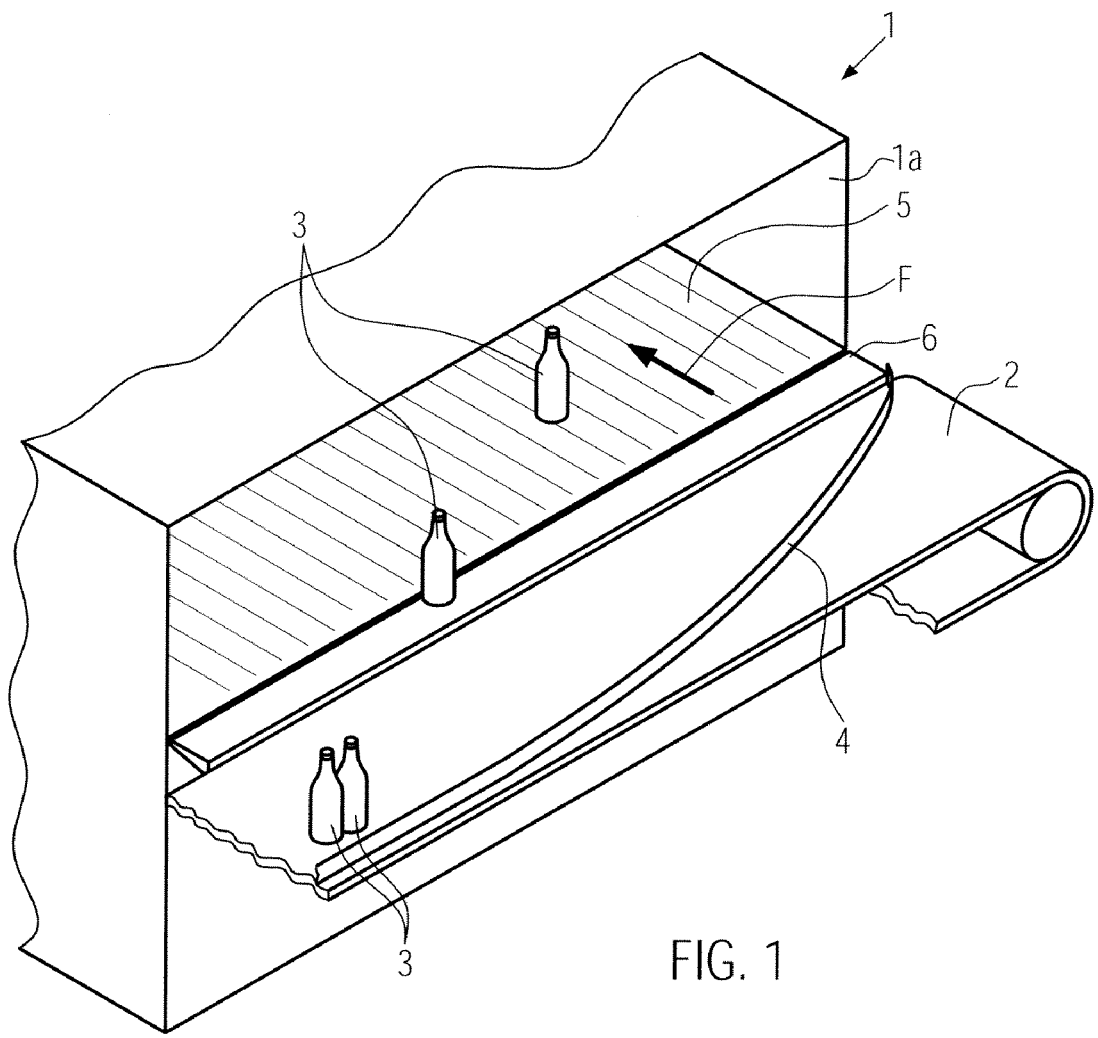
FIG. 1 a highly schematic perspective partial representation of a pasteurizer with a conveyor belt according to the disclosure, FIG. 2 a perspective plan view of a part of the conveyor belt according to the disclosure, FIG. 3 a view of the conveyor belt according to the disclosure from below, FIG. 4 a view of the conveyor belt according to the disclosure in the conveying direction, FIG. 5 an enlarged representation of a single segment, and FIG. 6 the enlarged detail A from FIG. 3.
Figure 2:
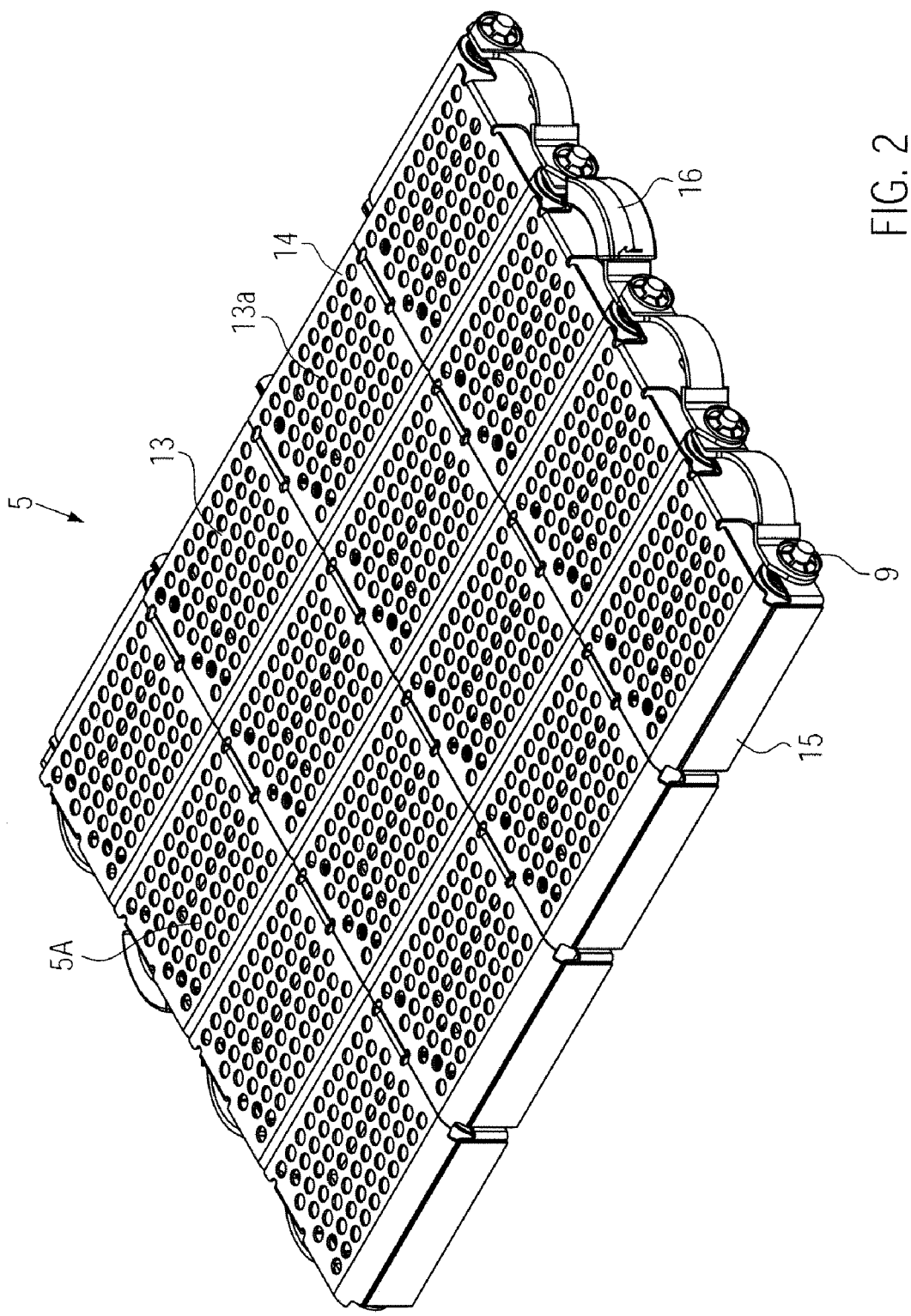
Figure 3:
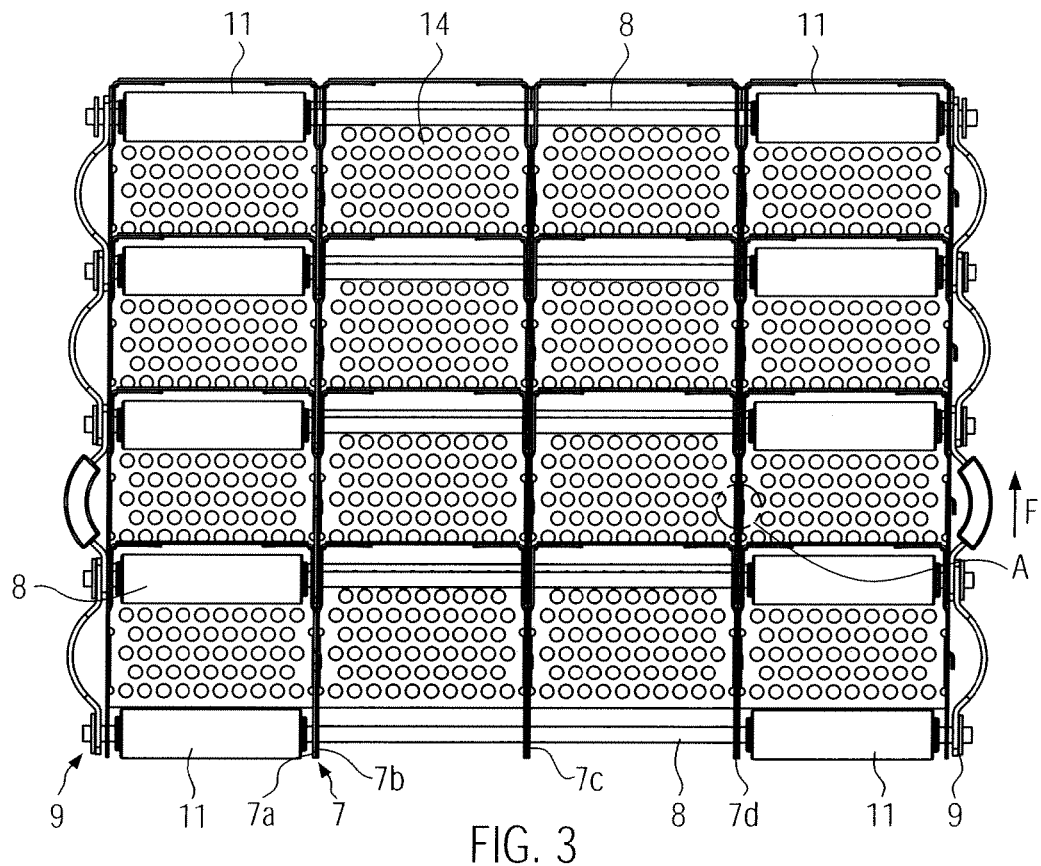
Figure 4:
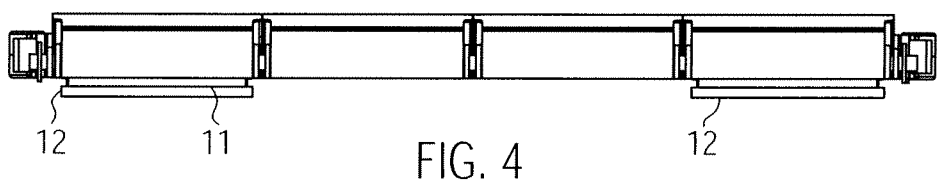
Figure 6:
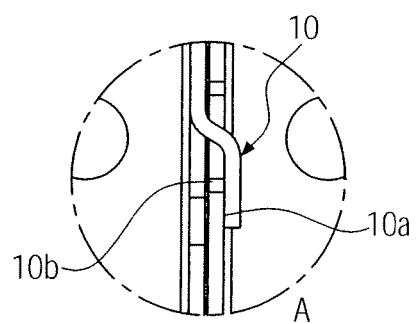

FIG. 1 shows a highly schematic, perspective illustration of the input region of a pasteurizer 1, which apart from the conveyor belt can be of the conventional type. The pasteurizer 1 is supplied via a conventional conveyor belt 2, which brings containers 3—here bottles are shown—to the input region 1a of the pasteurizer 1. The containers are preferably glass containers, with which the problems described due to the state of the art occur with glass breakage. However, the disclosure can be used for all types of container and need not necessarily be realized in a pasteurizer.

On the conveyor belt 2 the usual input strip 4 is provided which guides the containers 3 arriving on the conveyor belt 2 into the input region 1a. In the pasteurizer a conveyor belt 5 is provided on which the containers 3 are pushed over an overfeed panel 6 by the conveyor belt 2. The overfeed panel is smooth, without openings and preferably made of spring steel. Then the containers 3 are conveyed into the pasteurizer in the conveying direction F by the conveyor belt 5, they pass through it and at the opposite end are again conveyed over an overfeed panel onto a delivery device.

The conveyor belt 5 in the interior of the pasteurizer is described in more detail in FIGS. 2 to 6. The conveyor belt 5 is constructed of single segments 5A and has a carrying grid 7 of a large number of straps which are meshed together, whereby only the straps 7a, 7b, 7c, 7d of a transverse row running transversely to the conveying direction F are identified with reference numerals. Within the transverse direction the straps 7a to 7d are meshed to one another and in the conveying direction, i.e. within the longitudinal rows, they are meshed with adjacent straps.

Figure 5:
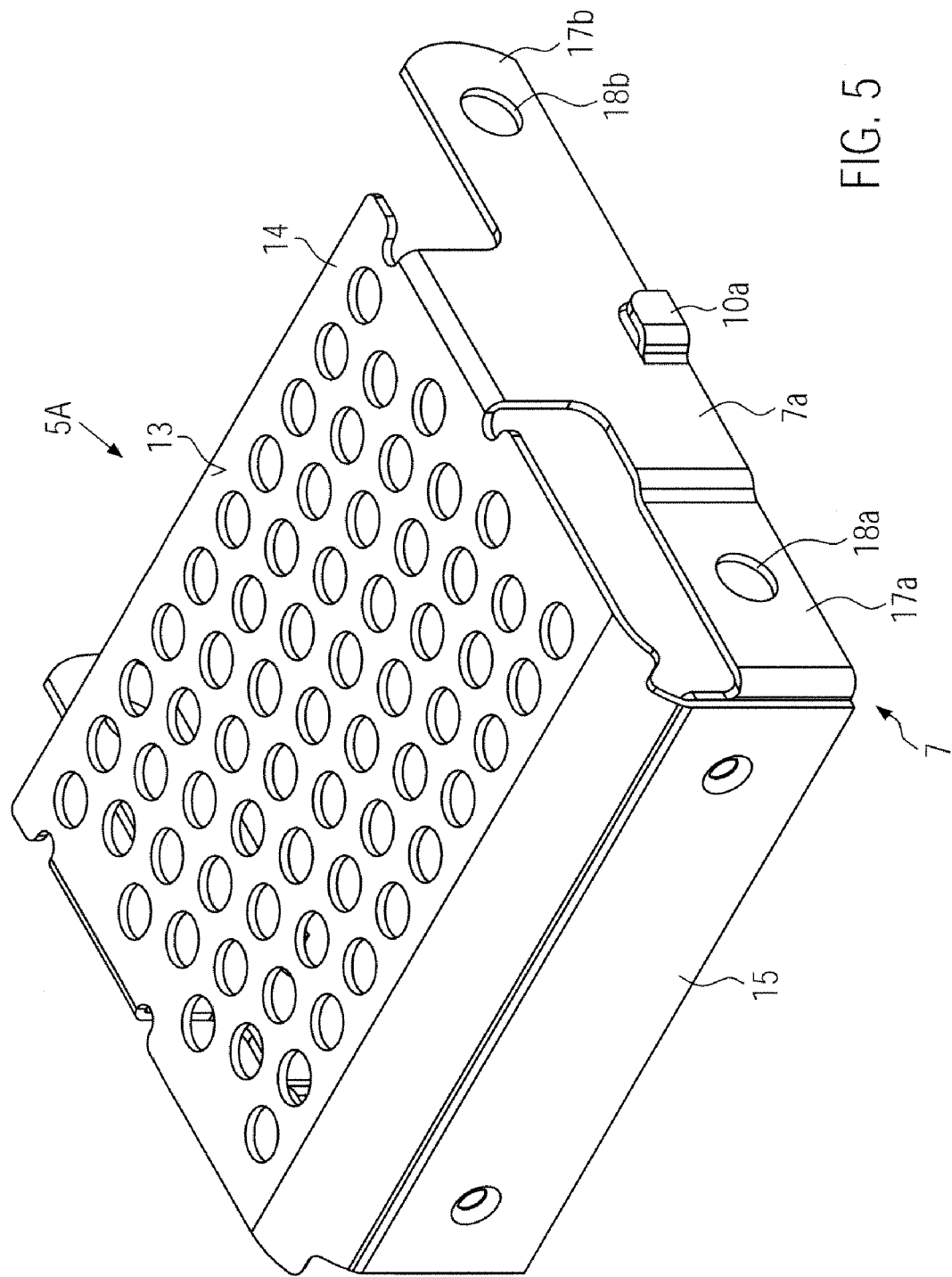

On the front and rear regions 17a, 17b of each strap in the conveying direction F the preceding and following straps of the adjacent transverse row in the conveying direction F overlap, whereby an articulated shaft 8 is supported in the holes 18a, 18b in each of the overlapping points. The articulated shafts 8 run over all segments 5A located in a transverse row. Each strap can thus pivot like a hinge about the articulated shaft 8 at the front in the conveying direction and at the rear in the conveying direction. The articulated shafts 8 are clamped at the sideward edges via a clamping device 9, for example a clamping wedge, so that the straps 7a to 7d seated on the same articulated shaft 8 are closely pressed together. Furthermore, between the individual straps of a transverse row the anchoring elements 10 illustrated in FIG. 5 are provided, which consist of a sheet metal strip 10a bent from one of the straps and which engage an opening 10b provided in the adjacent strap. Through these measures an essentially gap-free combination of the straps is ensured within a transverse row.

A support roller 11 is supported rotatably on each articulated shaft 8, but not necessarily in each strap. In the illustrated embodiment only the two outer straps 7a and 7d of each transverse row are provided with a support roller 11. The support rollers 11 can however also be distributed regularly or irregularly, depending on the load, over the carrying grid 7. The support rollers 11 run on a carrier 12 which is provided in the inner belt.

The conveyor belt 5 includes a conveyor surface 13, on which the containers 3 stand and which consists of single metal sheets 14, each of which is assigned to one of the straps of the carrying grid 7. The metal sheet 14 includes the portion 13a of the conveyor surface 13 allotted to it and an overlapping ridge 15, which runs essentially perpendicular to the conveyor surface 13a and extends over one of the two articulated shafts 8, assigned to each of the straps. The other articulated shaft 8 of the same strap is not covered by the assigned metal sheet 14, so that the adjacent metal sheet here can overlap with its ridge 15.

In this way the straps 7a to 7d and the assigned metal sheets 14 form in each case a segment 5a, from which the conveyor belt 5 is composed, whereby the metal sheets 14 of adjacent segments butt up closely together, so that no gaps open up between them which are not necessary for an articulated movement about the diversion rollers of the endless conveyor belt 5.

The metal sheet 14 preferably consists of stainless steel and is preferably formed penetrated, for example in the form of the illustrated perforated sheet. The ridge 15 can be formed simply by bending out of the same perforated sheet, but can also be manufactured separately from an unperforated sheet and attached to the perforated sheet.

In the illustrated embodiment the complete segment 5A with strap, metal sheet 14 and ridge 15 is bent from an appropriately shaped sheet metal blank and welded. As carrying grid 7 however, the carrying grid described in DE 10 2004 021 262 A1 can be used for example. Other carrying constructions are conceivable.

On the lateral edges running in the conveying direction F, the conveyor belt 5 is provided with support and guide straps 16 which bulge outwards and can be formed for spring action or for sliding friction. The support and guide straps 16 are in each case located between two adjacent articulated shafts 8 where they are fixed preferably together with the clamping device 9.

As a modification to the described and drawn embodiment, the carrier structure can also have other constructions. If required, slots or sideward gaps can be provided in the conveyor surface. Instead of stainless steel other suitable metals can be used.

The invention claimed is:

1. Conveyor belt comprising:
a conveyor surface formed of metal;
a plurality of support rollers arranged beneath the conveyor surface and support the conveyor surface;
the conveyor surface comprising a plurality of segments arranged in a row transversely to the conveying direction, which butt together and which are located adjacent one another without any gaps therebetween;
the segments of the transverse row being seated on at least one articulated shaft that joins the segments;
wherein a clamping device, which presses the segments together, is provided on at least one end of the articulated shaft; each segment having an overlapping ridge for interleaving a corresponding segment of a row at least one of preceding or following in the conveying direction;
the overlapping ridges of the segments of one row being aligned transversely to the conveying direction; and
a transverse joining device provided between the segments transversely adjacent to the conveying direction.

2. Conveyor belt according to claim 1, wherein the conveyor surface consists of a metal sheet, which is arranged horizontally.

3. Conveyor belt according to claim 1, wherein the conveyor surface consists of a perforated sheet of metal.

4. Conveyor belt according to claim 1, wherein the support rollers are arranged in a predetermined distribution beneath the conveyor surface.

5. Conveyor belt according to claim 1, wherein the support rollers are located in the vicinity of the outer edges in the transverse direction.

6. Conveyor belt according to claim 1, wherein each segment has a region of a carrying grid and a metal sheet containing a part of the conveyor surface.

7. Conveyor belt according to claim 1, wherein the support rollers are seated on articulated shafts, which are supported in the carrying grid.

8. Conveyor belt according to claim 1, and wherein support and guide straps are provided on the sideward edges of the conveyor belt.

* * * * *

UNITED STATES PATENT AND TRADEMARK OFFICE
CERTIFICATE OF CORRECTION

PATENT NO. : 8,162,134 B2
APPLICATION NO. : 12/876360
DATED : April 24, 2012
INVENTOR(S) : Krause Page 1 of 1

It is certified that error appears in the above-identified patent and that said Letters Patent is hereby corrected as shown below:

In the Claims

In Column 4, Line 19, in Claim 1, delete "surface;" and insert -- surface, rolling on a carrier; --.

Signed and Sealed this
Ninth Day of September, 2014

Michelle K. Lee
*Deputy Director of the United States Patent and Trademark Office*